(12) United States Patent
Behar et al.

(10) Patent No.: US 7,342,583 B2
(45) Date of Patent: Mar. 11, 2008

(54) AUTOMATED SYSTEM AND METHOD TO DEVELOP COMPUTER-ADMINISTERED RESEARCH QUESTIONNAIRES USING A VIRTUAL QUESTIONNAIRE MODEL

(75) Inventors: Albert Behar, Reston, VA (US); William Thomas Riley, Ashburn, VA (US); Jatinder Singh, Burtonsville, MD (US); Philip Andrew Syrne, Halethorpe, MD (US); Ofer Asif, Herndon, VA (US); Marco de Palma, Laurel, MD (US)

(73) Assignee: PICS, Inc., Reston, VA (US)

( * ) Notice: Subject to any disclaimer, the term of this patent is extended or adjusted under 35 U.S.C. 154(b) by 531 days.

(21) Appl. No.: 10/989,455

(22) Filed: Nov. 17, 2004

(65) Prior Publication Data

US 2008/0036784 A1 Feb. 14, 2008

(51) Int. Cl.
*G06T 11/00* (2006.01)
(52) U.S. Cl. .......................................... 345/440; 705/1
(58) Field of Classification Search .................... 705/1; 345/440
See application file for complete search history.

(56) References Cited

U.S. PATENT DOCUMENTS

| 6,496,827 B2 | 12/2002 | Kozam et al. |
| 2002/0143563 A1 | 10/2002 | Hufford et al. |
| 2002/0143577 A1 | 10/2002 | Shiffman et al. |
| 2002/0156640 A1 | 10/2002 | Hufford et al. |
| 2005/0091077 A1* | 4/2005 | Reynolds ........................ 705/1 |

OTHER PUBLICATIONS

SPPS Dimensions Component Pack (Website www.spps.com/component.pack) (30 pages) (prior to Nov. 2004).
Joseph E. Schwartz et al., Strategies for Analyzing Ecological Momentary Assessment Data, Health Psychology 1998, vol. 17, No. 1, 6-16.
R. Lorraine Collins et al., "Ecological Momentary Assessment In A Behavioral Drinking Moderation Training Program", Experimental and Clinical Psychopharmacology 1998, vol. 6, No. 3, 306-315.
Arthur A. Stone, Ph. D. et al., "Capturing Momentary, Self-Report Data: A Proposal For Reporting Guidelines", Guidelines For Momentary Research, vol. 24, No. 3, 2002, pp. 236-243.
Mihaly Csikszentmihalyi, Ph.D., et al., "Validity and Reliability of the Experience-Sampling Method", vol. 175, No. 9, pp. 526-536 (1987).
Saul Shiffman, "Assessing Smoking Patterns and Motives", Journal of Consulting and Clinical Psychology 1993, vol. 61, No. 5, 732-742.

(Continued)

*Primary Examiner*—Almis Jankus
(74) *Attorney, Agent, or Firm*—Nixon & Vanderhye P.C.

(57) ABSTRACT

A configurable electronic system provides a software based system by which researchers set up self-monitoring field protocols in a common computer format and deploy the protocols to computer devices to research participants. The system includes electronic software modules of tasks useful in generating of questionnaires for recording research data. By selecting, modifying and sequencing the modules, a researcher generates a sequence of questionnaires to be displayed on the computer devices operated by the research participants. The participants' computer devices include alert queues to stage questionnaires to be presented to a participant and resolve conflicts between questionnaires staged at substantially the same time.

26 Claims, 4 Drawing Sheets

OTHER PUBLICATIONS

Arthur A. Stone et al., Measuring Daily Events and Experiences: Decisions For the Researcher, Measuring Daily Events and Experiences, Journal of Personality 59:3, pp. 575-607 (Sep. 1999).

Linda M. Collins, et al., "The Effect of the Timing and Spacing of Observations In Longitudinal Studies of Tobacco and Other Drug Use: Temporal Design Considerations", Drug and Alcohol Dependence 68 (2002) S85-S96.

Kathleen A. O'Connell, et al., "Coping In Real Time: Using Ecological Momentary Assessment Techniques To Assess Coping With The Urge To Smoke", Research in Nursing & Health, 1998, 21, 487-497.

Sharon L. Foster et al., "Practical Issues In Self-Observation", Psychological Assessment 1999, vol. 11, No. 4, 426-438.

Petra Hank et al., "Chapter 6—An Analysis of Experiential and Psychometric Equivalence", Computer-Assisted Versus Paper-and Pencil Based Self-Monitoring, pp. 85-99 (prior to 2004).

R. Lorraine Collins et al., "The Feasibility of Using Cellular Phones To Collect Ecological Momentary Assessment Data: Application to Alcohol Consumption", Experimental and Clinical Psychopharmacology 2003, vol. 11, No. 1, 73-78.

Krislea E. Wegner et al., "An Evaluation of the Relationship Between Mood and Binge Eating in the Natural Environment Using Ecological Momentary Assessment", Mood and Binge Eating, Wiley Periodicals, Inc., pp. 352-361 (2002).

* cited by examiner

AUTOMATED SYSTEM AND METHOD TO DEVELOP COMPUTER-ADMINISTERED RESEARCH QUESTIONNAIRES USING A VIRTUAL QUESTIONNAIRE MODEL

FIELD OF THE INVENTION

This invention relates to a system for automating the development of computer-administered questionnaires. In particular, the invention relates to systems for generating field protocols comprising questionnaires and other data collection procedures that prompt participants to enter information into automated data collection devices.

BACKGROUND OF THE INVENTION

Logs, diaries, checklists and other self-monitoring tools are an ubiquitous part of nearly all research. Paper-based self-monitoring tools have been used to assess a range of subject behaviors including substance use, medication use, medical symptoms, and physical activity. Essentially any behavior, thought, or emotion has been self-monitored for research purposes.

To improve accuracy, reduce retrospective recording, and address the compliance difficulties of pencil-and-paper self-monitoring procedures, a range of technologies have been applied to self-monitoring methods. Csikszentmihalyi & Larson (1987) developed the Experience Sampling Method (ESM) in which a pager or other timing device prompts the subject to observe and record the presence or absence of the target behaviors. The prompt to record improves subject compliance with the field protocol while also reducing monitoring burden since the behaviors are sampled instead of being continuously monitored. Shiffman, Stone, and colleagues (Shiffman, 1993) developed the Ecological Momentary Assessment (EMA) method which delivers the self-monitoring procedure on handheld data collection computers, such as Personal Digital Assistants (PDAs). Since that time, EMA has been used to self-monitor a range of smoking associated variables including coping responses to cravings (O'Connell, Gerkovich, Cook, Shiffman, Hickcox, & Kakolewski, 1998), alcohol use (Collins, Morsheimer, Shiffman, Paty, Gnys, & Papandonatos, 1998) and eating disorder behaviors (Wegner, Smyth, Crosby, Wittrock, Wonderlich, & Mitchell, 2002). As work using EMA technologies expands, standards for analyzing (Schwartz & Stone, 1998) and reporting (Stone & Shiffman, 2002) EMA data are being increasingly standardized and accepted.

Foster and colleagues (Foster, Layerty-Finch, Gizzo, & Ostantowski, 1999) have noted that computer-administered methods offer a number of advantages over pencil and paper diaries including: a) automated scheduled prompts for recording (similar to the ESM method), b) automated date and time recording to assess and control the elapsed time from prompt to actual entry, c) ability to prevent subjects viewing previous responses to minimize the influence of prior entries, d) greater recording method flexibility, e) portability while also being sufficiently intrusive to serve as a recording cue, and f) elimination of manual entry of log or diary responses to a database, saving time and eliminating transcription errors. Stone, Kessler & Haythornthwaite (1991) also noted that computerized programs offer the potential for greater complexity of the monitoring procedure (e.g. branching logic) since the computer guides the administration. Compliance rates to prompted self-monitoring, especially computerized prompting and recording, have generally been high, typically exceeding 90% (Foster et al, 1999). Some studies have found lower completion rates of computerized vs. pencil-and-paper systems resulting from the inability of subjects to use computers to complete entries retrospectively. (Hank & Schwenkmezger, 1996; Collins, Kashdan, & Gollnisch, 2003).

A disadvantage noted by Foster et al. (1999) of computerized self-monitoring systems is that the systems are costly to develop. Collins and Graham (2002) have argued that, although EMA is promising, it is too costly to be utilized for many research questions. With EMA, there are considerable programming costs required to develop and test the screen displays, the input and output functions, navigation, scheduled prompting functions, database integrity, and the conduit functions for uploading and downloading of information regarding the field protocol. These programming efforts must be undertaken for each study in which a different self-monitoring procedure is used. Even with recent commercial efforts to address the issues of programming costs and expertise for researchers desiring a computerized self-monitoring system, these programming costs remain prohibitive for all but the largest and most well-funded research organizations. In clinical settings in which the monitoring system must be flexible enough to be tailored to each client or patient, such frequent reprogramming is not a viable option, effectively excluding computerized self-monitoring from small clinical trials.

BRIEF DESCRIPTION OF THE INVENTION

For electronic diaries or computerized self-monitoring to be adopted as the research standard, a flexible and researcher-configurable field protocol design software application is needed. A researcher-configurable application would allow researchers to design the self-monitoring field protocols they wish to implement (i.e., questionnaires comprising items, response formats, alert schedules, etc.) using a simple desktop computer program which generates an electronic data file that can be read and implemented by a variety of computer devices, particularly mobile devices such as PDAs, smart phones and other handheld computer devices.

The field protocol design system disclosed allows a researcher with no practical computer programming experience to design field protocols deliverable on any computer device with no greater difficulty than the researchers would experience designing a paper-based system. Given the wide range of research in which self-monitoring or other forms of field evaluation are used, the system is flexible and allows the researcher to define each questionnaire item, the response format, validation ranges, and to schedule alerts for recording information collected from the participants.

A configurable electronic real-time field protocol design system has been developed that provides a software based system by which researchers set up the self-monitoring (or observational or interview) field protocols they wish to deliver to a PDA or other electronic data collection device used by research participants. The researcher has full flexibility to construct the content for each of the items in the questionnaire and select from a range of response types, e.g. numeric, text, integer rating, yes/no, categorical, visual analogue. The system also may allow for response branching capabilities, allowing for complex skip patterns and branching sequences of questions. In addition, multiple questionnaires can be "layered" in a single protocol, allowing researchers to administer multiple questionnaires at different times to the same participant on a single data collection computer. The system includes electronic templates of questionnaires and forms for specific study needs. Software modules and object oriented software programming techniques allow researchers to electronically select individual tasks from a library of tasks, insert the task logically into a questionnaire, and tailor the task to the questions. By selecting, modifying and sequencing the templates, a researcher generates a sequence of questionnaires (comprising prompts and data collection forms) to be administered on a computer device used to collect data from research participants (data collection computer).

The system allows researchers to set a range of alerting functions for each questionnaire including fixed and random scheduling to trigger each sequence of questions. The program enables the association of alerts to questionnaires. The alerts may be user-initiated, unprompted responses and conditional alerts, e.g. if item A answered "yes", then alert to complete questionnaire B in 2 hrs.

The field protocol design system also provides a self-configuring alerting mechanism that allows questionnaire responses to determine which additional questionnaires should be presented to the participant. The system includes an alert queue to stage questionnaires to be presented to a participant and resolve conflicts between questionnaires staged at substantially the same time. The questionnaires are staged when their alerts are triggered by various events or times. To handle conflicts with overlapping alerts, the alerts are prioritized so that simultaneous alert collisions can be resolved by the alert queue.

DETAILED DESCRIPTION OF THE INVENTION

Figure 1:
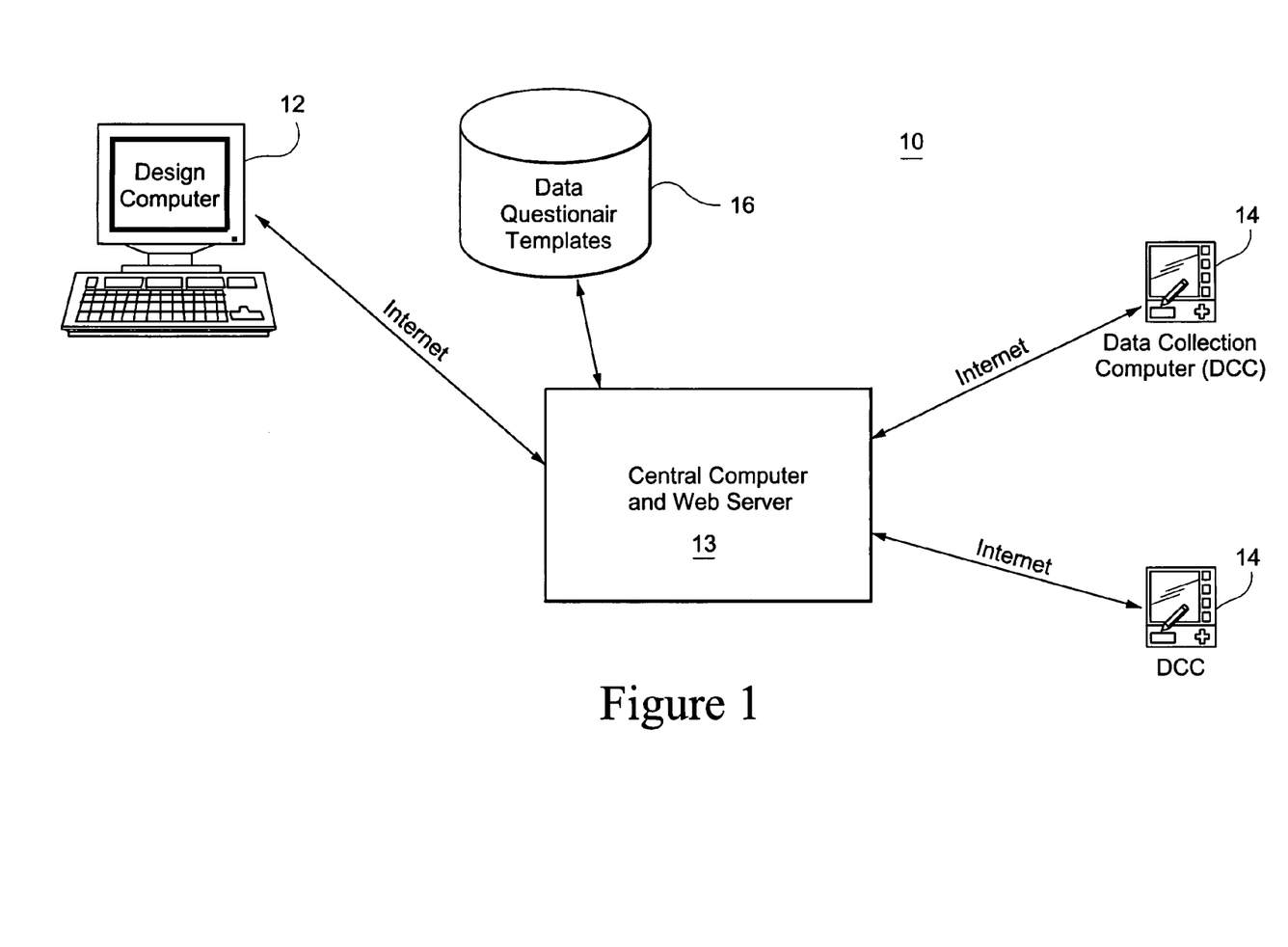
FIG. 1 is a schematic diagram of a system for developing and deploying research questionnaires using a virtual questionnaire model.

FIG. 1 is a schematic diagram of a field protocol computer system 10 for developing and deploying field protocols for research using a virtual questionnaire model. The system may include a protocol design computer 12, e.g., a personal desktop computer, that is used by a researcher to develop questionnaires, alerts and data collection procedures to be computer-administered to research participants. Using the design computer, the researcher designs a series of questions, alerts and data collection prompts to implement a field protocol to be followed by one or more research participants.

Each field protocol may be tailored by the researcher for each participant or for groups of participants. For example, the researcher may program the questionnaires to prompt each participant to take the medication prescribed to that participant.

A central computer system 13 may be provided as a central source of questionnaire and field protocol templates, software for developing questionnaires, a library of software modules of tasks to be used to create questionnaires, alert sequences and data collection prompts, data collection and an interface between the design computer and the data collection computer devices 14, e.g., personal digital assistants (PDAs), used by the research participants. Each participant may have his own assigned data collection computer 14 that prompts the participant to perform actions prescribed by the field protocol and collects information from the participant.

For example, a standard set of alerts and questionnaires for a particular field protocol may be stored on the database memory 16 of the central computer 13. The researcher working on the field protocol downloads the standard field protocol to his design computer and tailors the standard set of alerts and questionnaires for each research participant.

The central computer system 13 is optional and one or more of its functions may be performed by the design computer. The central computer 13 may interact with the design computer 12 and the data collection computers 14 through the Internet and web-browser software. In particular, the central computer may host a website which can be accessed by a researcher via a design computer and by participants via their data collection computers.

The researcher, from his design computer, may access the website of the central computer to: revise or develop the questionnaires, alert sequences and data collection prompts for a field protocol; test the alert sequences to ensure that alert conflicts are resolved; deploy questionnaires, alert sequences and data collection prompts to the data collection computers of the study participants; and review data collected on the data collection computers and uploaded to the central computer system. The participants may access the website of the central computer to download to their data collection computers questionnaires, alert sequences and data collection prompts, and other instructions and information as required for the research study. After entering data participants may upload the data collected on their data collection computers.

The central computer system 13 may access a database 16 that stores questionnaire and other form templates, a library of software modules for tasks to be used to form questionnaires, software for developing sequences of questionnaires, instructions, alerts and data collection prompts to be used by research participants. The database may also store data uploaded from the data collection computers of participants.

The data collection computers may be remotely synchronized to the central computer and/or to the researcher's design computer using an Internet connection and a website. The provision of the web server functionality allows for remote synchronization of the data collection computers. For nationwide trials or multi-site studies, all data can be synced to the central server location regardless of the location of the participants, or those collecting data from participants, and the data collection computer. Participant monitoring can be performed with greater regularity, a particular advantage when patient monitoring needs to be performed more frequently than can be performed via office visits to a physician. Participant compliance to data collection also can be reviewed more regularly and reminders or other interventions can be performed if recording compliance is poor. Further, the potential for lost data is reduced if syncing occurs frequently.

Figure 2:
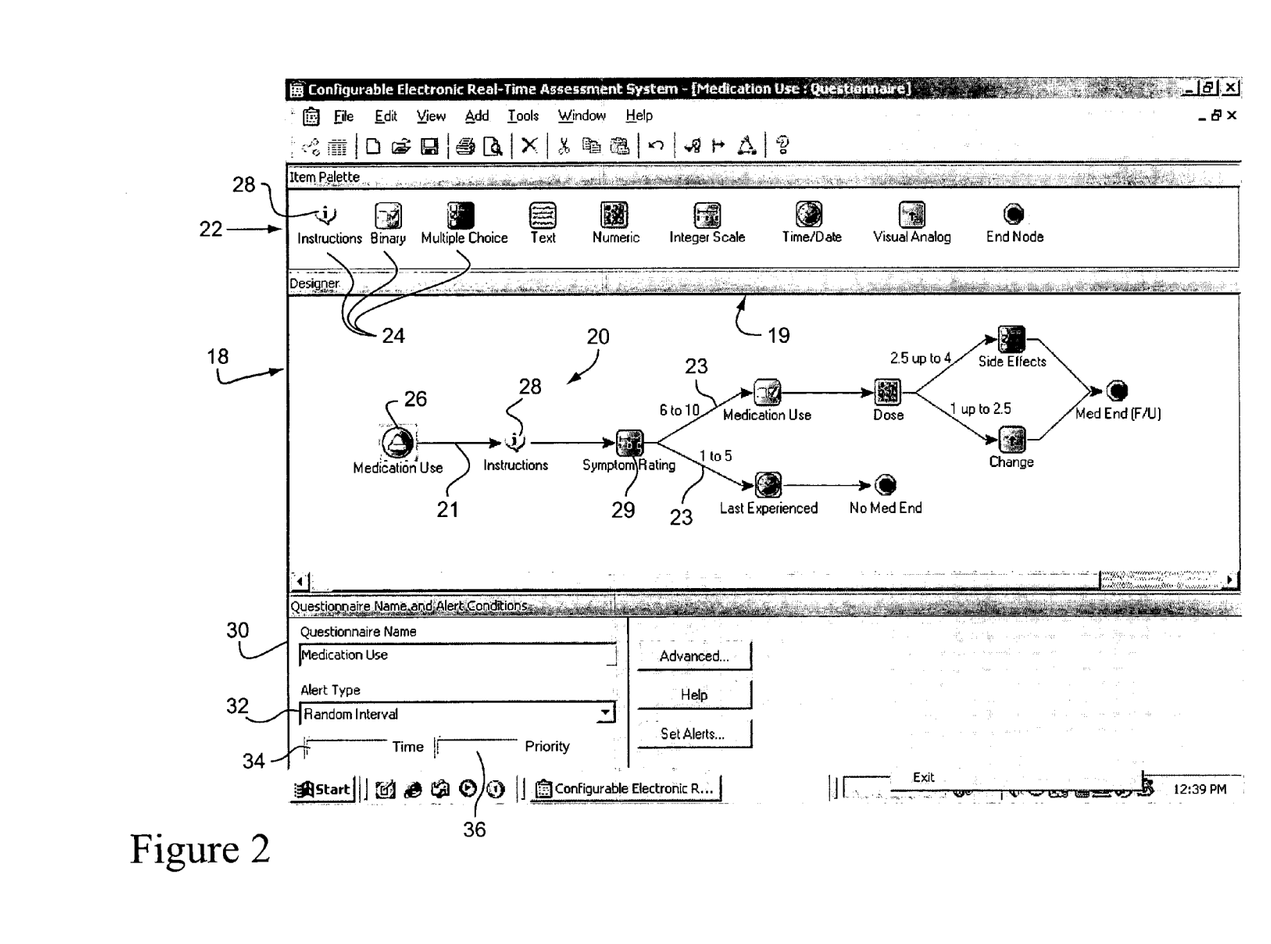
FIG. 2 is a screen image generated by a software program for generating self-monitoring programs for research.

FIG. 2 is a screen image 18 generated by a software program for generating self-monitoring field protocol programs. The software program is easy to use and allows researchers to design questionnaires for field protocols that they wish to implement (items, response formats, alert schedules, etc.) using a simple computer graphical user interface (GUI). The program generates a digital file for a field protocol that can be read and implemented by data collection devices, e.g., PDAs, used by the research participants. The data collection computer may be provided to research participants for data collection and synchronized with the central computer to upload the collected data for analysis.

The field protocol design software system allows a researcher with no practical programming experience to design or modify a self-monitoring field protocol with no greater difficulty than they would experience designing or modifying a paper-based field protocol system. The system is flexible, allowing the researcher to define each item, e.g., node, in each questionnaire, the response format, validation ranges and schedule alerts for recording information. Researchers may use the system software to perform specific tasks including (including without limitation): a) opening and naming a blank field protocol, b) creating a new questionnaire 30 in the field protocol, c) describing the nature of the various alert types and item type choices 32, d) configuring a sample questionnaire using different node types 20, e) viewing the resulting questionnaire in a designer view 18, f) modifying the questionnaire in the designer view including inserting and deleting nodes, changing node attributes, and producing a branched item series, g) using auto-layout whereby nodes in the diagram 18 are positioned to have a equal distance between adjacent nodes, h) using validate functions which determine if all nodes in a diagram can be translated into a questionnaire on the data collection computer, i) simulating the questionnaire by creating a representation of a screen display of a data collection computer on the desktop computer, and j) viewing the questionnaire in list view where each question and possible answers are shown in tabular order. Researchers may download and synchronize the created questionnaire to the data collection computers. To test the data collection computers, the researcher may use the data collection computers as a participant would to complete the questionnaire created.

The design program allows for any series of questions or other items of a field protocol to be modified. The researchers may share the questionnaires and field protocol templates with other researchers. Standardized questionnaire templates of public domain assessment tools can be developed and stored in the database 16. Entire field protocols, including questionnaires and other information may be stored in the database 16. These standard templates and field protocols allow researchers to quickly develop a questionnaire or field protocol using standardized assessment tools.

The system allows researchers to set a range of alerting functions including fixed and random scheduling for prompting question marks. The system also allows for user-initiated, e.g. unprompted, responses and for conditional alerts, e.g. if item A answered "yes", then alert to complete questionnaire B in 2 hrs. The researcher has full flexibility to construct the item content for each of the nodes in the questionnaire and can select from a range of response types e.g. numeric, text, integer rating, yes/no, categorical, visual analogue. The system also allows for response branching capabilities, allowing for complex skip patterns and branching sequences between nodes. In addition, multiple questionnaires can be "layered" in a single field protocol, allowing researchers to administer multiple questionnaires at different times to the same participant on a single data collection computer.

Although the system is designed primarily for self-monitoring purposes, it may be used for any field data collection, including interview and observational procedures. The system groups questionnaires into "field protocols", allowing the researcher to deliver multiple questionnaires within a single field protocol. A field protocol is a series of questionnaires, prompts, information presentations, data collection field, alerts and other items used by participants in a self-monitored clinical trial or other interview and observational procedures.

The screen image 20 shows a questionnaire logic diagram that prompts a participant through a sequence of nodes (comprising prompts and data collection screens to be displayed on a data collection computers) for taking a particular medication. Questionnaires can be produced in a number of ways, such as by tailoring an existing questionnaire and creating a new questionnaire. Questionnaires may be tailored or generated using the node palette 22 in which the user drags and drops the desired node 28, e.g., nodes, response type into a screen box 19 for assembling a questionnaire. A screen box 19 on the design computer display provides a graphical platform on which a questionnaire can be formed by selecting icons, each representing a step of the questionnaire, and arranging the icons in a logical sequence corresponding to the steps of the questionnaire. The nodes are logically linked in the desired order to form the steps of the questionnaire.

This "designer view" method provides the researcher with a familiar flow chart metaphor which provides a visual representation of the questionnaire. The screen box 19 in which the questionnaire sequence 20 is assembled allows the researcher to select operational nodes 24 (icons) from a palette 24 and placing the nodes in sequence. The researcher links the nodes by linking arrows 21 that establish the sequence in which each operation is to be performed.

The operational nodes (indicated by icons) are linked to executable software program modules. The modules may be selected, tailored and linked to form questionnaires. A library of modules are stored in the database of the central computer. The modules each perform a certain task that can be selected and inserted in a questionnaire. These modules are standardized and use structured data that allows the modules to be linked automatically to exchange data with the database, and control the flow of information with other modules. The modules may be based on a conventional object oriented programming language. A module can be programmed into the logical sequence of a questionnaire by dragging the icon corresponding to the module from the palette, copying the icon to the screen box to form a node in the questionnaire and linking the icon-node to other icon-nodes in the screen box. Once an icon-node has been selected, the researcher defines the attributes of each node, e.g., the item content, response values, validation parameters, allowing for "don't know" as a response option, and response branching. A graphical user interface allows the researcher to define the attributes of each node-icon with relative ease and without special training in computer programming.

To logically link the node-icons, the researcher selects the arrowhead of a line in the diagram 23 and using computer mouse gestures may position the arrowhead near another node. After positioning the arrowhead, a heuristic algorithm may be used to determine if an arrow should be linked to a node depending on the distance of the arrow from the node. Similarly, the node may be automatically linked to existing node using a heuristic algorithm depending on the distance of the node from existing arrowheads. A node, e.g., instruction icon node 28, selected from the palette 22 and inserted into the screen box 19 for constructing a questionnaire is automatically linked to adjacent nodes already in the box 19. A heuristic algorithm determines which nodes are to be linked, and the researcher can manually reconfigure the links between nodes. Where the node sequence is to branch, multiple arrows 23 show alternate legs of the remaining sequence steps. Nodes 24 may be inserted over an existing link in the diagram 23, which splits the connection between two existing nodes and merges the new node into the existing link. A heuristic algorithm may determine if the new node can be merged into an existing link, by calculating the perpendicular distance from center point of the position of the new node 24 to the vector determined by the center point of the two existing nodes 26 and 29, limited by the size of the angle subtended from the point and the vector.

The researcher determines and enters the logic value ranges used to determine how a questionnaire is to branch. The logic values used to select between the two or more alternate node sequence steps is indicated adjacent to each of the branch arrows. For example, a symptom rating node 29 indicates a step in which the participant enters a rating level. The branch arrows 23 indicate that if the entered rating is 6 to 10, one leg of the sequence is followed and another sequence leg is followed if the rating is 1 to 5.

The researcher selects an operation icon-node from a palette 22 which includes (for example): instructions, binary, multiple choice, text, numeric, integer scale, time/date, visual analog and end node. Each operation node 24 on the palette is a graphical user interface to a software program module that assists the research setup of the desired operation. For example, a start node 26 is selected to establish a new sequence for collecting data regarding the usage of medication by a participant. The start node also includes the alert or alerts applied to trigger the questionnaire sequence.

For example, each node 26, 28, 24 may be linked to an electronic template of the desired operation for the node. The software modules corresponding to each node follow a structured data format that allows each module to exchange data with the database. The template may be, for example, an electronic form arranged in extensible markup language (XML). XML is a universal format for structured documents and data on the Web (Internet) and in software programs. Structured data may include alerts, text, graphical images, e.g., symbols and selection boxes, configuration parameters, data and drawings. As is known in the art, XML is a set of rules for designing text formats that allows computers to generate and read data, and ensure that the data structure is unambiguous. Generally, XML allows text, graphic or data fields to be each defined by an associated tag that states that format and type of information, e.g., text, graphics or data, that is permitted in the field. XML may be used to create a template of an operation in a questionnaire such as: start and end nodes for questionnaires; alerts associated with start nodes; templates for inputting by a research participant information in a binary mode (e.g., did you take your medication), multiple choice input template (e.g., did you experience any of the following symptoms after taking your medication), numeric data entry (e.g, how long did you exercise), or an integer rating scale (e.g., a 1 to 10 rating of wellness with "feeling good" on one end of the scale and "feeling lousy" on the other end of the scale); graphical images, (e.g, a visual analog presentation), and a template for selecting a date and/or time for an event.

The XML templates (which are examples of a software module) for the nodes 24 allow researchers to create an operation in a questionnaire, in a simple and easy manner. The template may be tailored by the researcher to suit the desired questionnaire or the participant(s) that will respond to the questionnaire. The researcher does not require extensive computer skills to modify the template for the node in his questionnaire. Once the researcher has modified the template, it is ready to be placed as a node in the questionnaire. The researcher links the nodes 26, 28 by linking arrows 21, 23 that establish the logical sequence of the nodes in the questionnaire. An entire questionnaire, including the alerts associated with the start node, may be generated by selecting and modifying operational nodes 24 and arranging the nodes in sequence using the linking arrows.

After using the start node to begin a new process, the researcher selects the steps for the corresponding questionnaire. For example, the instructions operation 28 may be selected to call up a software program that allows the researcher to enter text instructions to be given to the participant regarding a particular medication. The instruction operation formats the instructions for display on the data collection computers. As each node operation 24 is selected, the node XML template file associated with the operation may be opened so that the researcher may setup the screen format and data fields for the operation. Other node operations 24 present the researchers with templates for generating process steps and screen images for the data collection computers that prompt the participant to: indicate whether an event has occurred, e.g., a binary selection to indicate that a medication has been taken; chose between multiple choices, such as side effects of a medication; enter text or numeric values, such as the dosage of medication; present the participant with a scale to enter information regarding degree of a symptom or well-being; a time or date value when medication has been taken; a visual analog image to provide a continuous rating of an experience of the participant, and an end node for the sequence.

Once the sequence for a questionnaire 20 has been generated, the questionnaire is assigned a name 30, e.g., medication use, and an alert type 32. The default alert setting is "user initiated" or no alert, but researchers can select scheduled, fixed, random, or conditional alerting schedules.

Scheduled: Alerts to complete the questionnaire occur at researcher specified times 34 (e.g. 8:00 am, 9:00 pm).

Fixed Interval: Alerts are defined by a start time and by fixed intervals thereafter, e.g., first alert at 8:00 am and alerts every 4 hrs. thereafter until 10:00 pm.

Random Interval: Alerts are defined by a start interval, e.g., first alert no earlier than 8:00 am but no later than 9:00 am, and by random intervals thereafter—e.g. every 3 to 6 hrs. thereafter.

Conditional: Alerts are defined by the completion of a specific branch of a previous questionnaire. For example, for the branch of questionnaire A which indicates that the participant took the prescribed medication, alert to complete questionnaire B 2 hrs. later.

The researcher may also establish priorities 36 for alerts, e.g., priority levels 1-5. The priority of alerts are used to resolve conflicts between two or more contemporaneous alerts. In addition to setting the alert functions each day, the researcher can also select the days of the week in which these alerts are enabled or disabled, and can specify the window of time by which the questionnaire must be completed before the questionnaire is no longer available on the data collection computers for the participant. By default, questionnaires do not allow for the participants to go back and correct a prior response, but the researcher can configure the questionnaire to allow the participant to go back one item if desired.

Once the questionnaires for a field protocol have been defined, there are a number of additional features provided by the design computer for the researcher to check the questionnaire for completeness. A validation function checks that all items are connected and terminate at an "end node" and that all items have the necessary attributes (e.g. item content) to be delivered on the data collection computer. A simulator function allows the researcher to view the questionnaire on the design computer in a manner similar to what the participant will experience on the data collection computer. This simulation can start from any point in the questionnaire, allowing the researcher to review specific segments of the questionnaire. Finally, the system provides a "list view" which provides the researcher with a virtual codebook of each variable name, node content, response values, response labels, and the order of the nodes in the questionnaire and field protocol. The list view and design view of a questionnaire, as well as the protocol screen, also can be printed.

Figure 3:
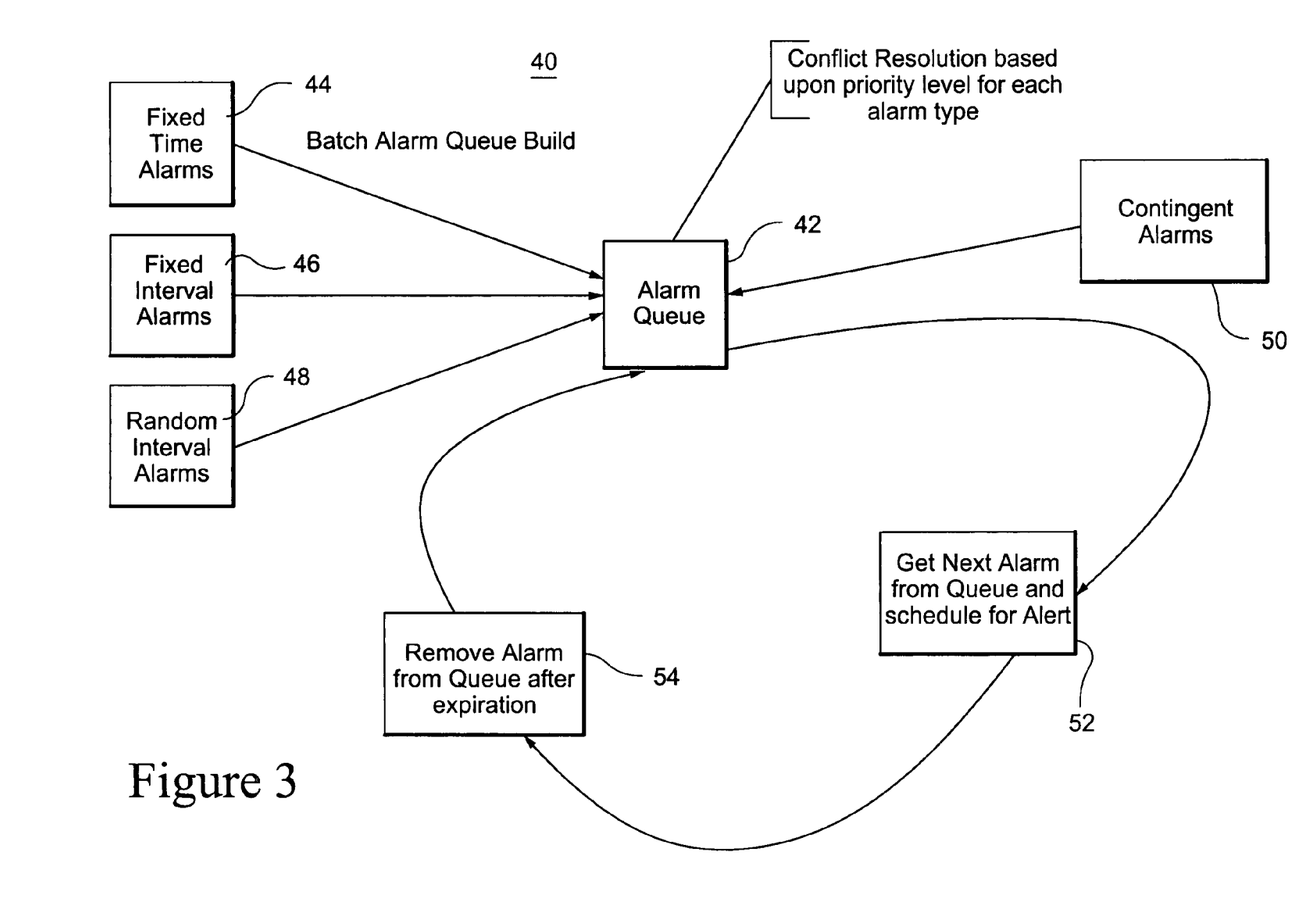
FIG. 3 is a schematic diagram of the data flow of the system shown in FIG. 1.

FIG. 3 is a state diagram of the alerting mechanism 40 applied to determine the order in which each of the questionnaire sequences are presented on the data collection computer. The alert attributes set in the start node 26 of each questionnaire sequence determines the timing and order in which each of the questionnaire sequences are to be presented on the data collection computer. The alerting mechanism 40 is a software routine run on the data collection computer that includes an alert queue 42 that determines when to start each of the questionnaires of a field protocol.

The timing of each of the questionnaires is determined based on the alerting scheme established in the start node for the questionnaire. The alert schemes include fixed times 44 at which a questionnaire is to start, fixed time intervals 46 at which a questionnaire is to repeat, and random intervals 48 between repetition of a questionnaire. A timer in the data collection computer determines when the various timed alerts occur. Contingent alerts 50 are triggered on the occurrence of events which are typically events recorded during the performance of another questionnaire.

The alert queue 42 tracks each of the alert events 44, 46, 48, 50 active on the field protocol running on the data collection computer. As each alert event occurs, the questionnaire corresponding to the alert is staged in the queue 42 and the staged questionnaire is ready to be performed on the data collection computer at the next available time period. If two or more alert events occur at the same time or while another questionnaire is being performed, the alert queue resolves the conflicting alerts based on a priority level 36 assigned to each alert in the start node 26.

The queue 42 stores the non-selected alerted (staged) questionnaire(s) so that they are performed after the higher priority alert/questionnaire is completed, in step 52. As the alert/questionnaire is completed, it is removed from the queue in step 54. An alert/questionnaire remains in the queue until completed to ensure that the participant is prompted to complete pending questionnaires that have been triggered by alerts.

Figure 4:
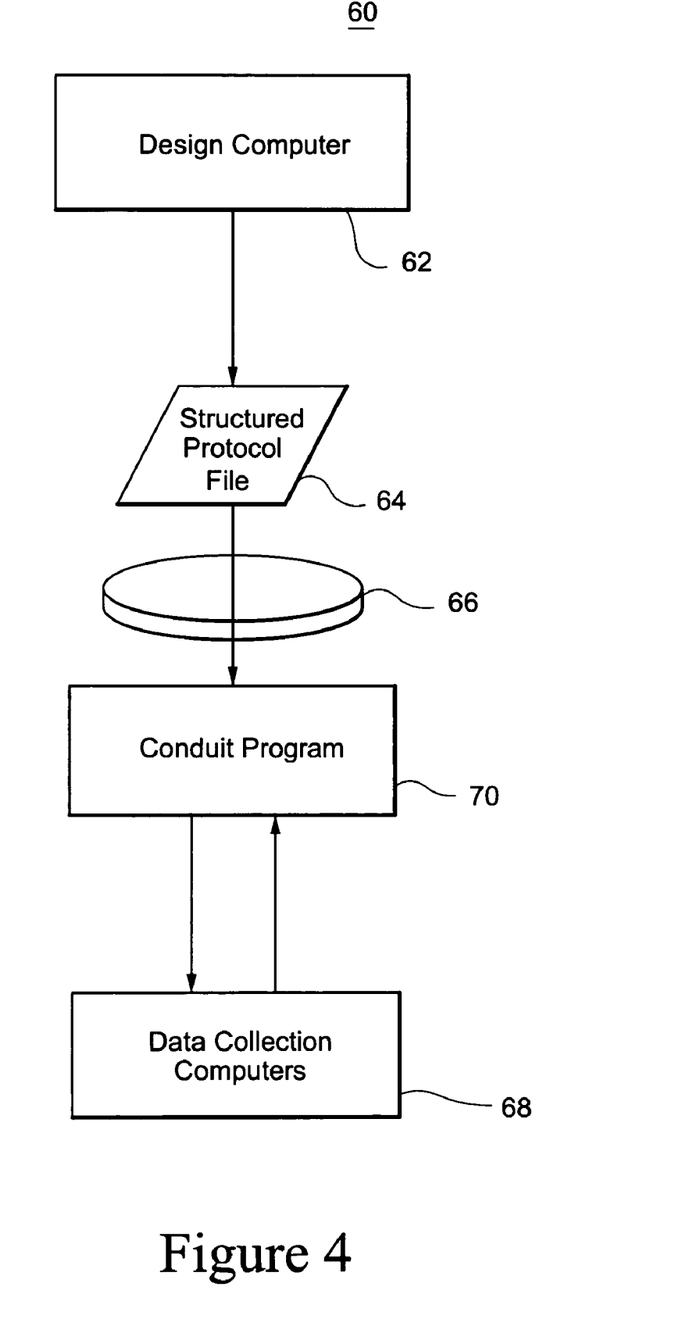
FIG. 4 is a schematic diagram of the data flow architecture of the system shown in FIG. 1.

FIG. 4 is a flow chart 60 showing the transfer of data and field protocols from the design computer to multiple types of data collection computers. The design computer is used to generate the questionnaires for the field protocol in the manner described above. The design computer tests the field protocol by displaying a flow diagram representing the sequence of questionnaires based on possible responses. The researcher may modify the questionnaires and alerts based on the testing on the design computer in step 62.

Once an entire field protocol, which may include several questionnaire sequences, has been fully developed and is ready for use, the field protocol is saved using a structured file format, such as extended markup language (XML) in step 64. The researcher synchronizes the data collection computers to his design computer or central server. A dialog screen is displayed on the design computer 62 during a synchronization procedure and asks the researcher to specify the field protocol to be downloaded to the data collection computers.

The saved field protocol file 66 is downloaded to the data collection computers 668 using a conduit program 70 that parses the field protocol files and loads the parsed file program on the data collection computer. The conduit converts the format of the field protocol file 66 to formats suitable for each of the different types of data collection computers. The conduit relieves the researcher from having to have just one type of data collection device or to manually tailoring the field protocol for each of the different types of data collection device. For example, the conduit may convert the questionnaire to Wireless Markup Language (WML) or equivalent for certain types of data collection computers, such as cell telephones, and to custom format data for other types of data collection computers such as PDAs.

Once the data collection device has received the field protocol file from the conduit program, the device prompts the participant to follow the field protocol. As the participant responds to the questionnaires of the field protocol, the participant enters responses and data into the data collection device. After collecting data, the data collection device is synchronized with the central computer 13 and the resulting data are uploaded, currently in an ASCII format, for porting to a statistical software package for analysis or any other software for any purpose. The data is uploaded from each of the data collection devices to the central computer and web server 13. The uploaded data from each of the data collection devices is aggregated and stored as structured data in the database 16. Researchers may, via their design computer 12, view the data uploaded from the data collection devices. The researchers may, for example, view the data collected from any one of the individual data collection computers to review how a selected participant is following the field protocol, view the aggregated data to determine how all or sub-groups of participants are performing the field protocol, and run database inquires to obtain information from the database regarding the performance of the participants performing the field protocol.

Email alerts may be specified to be automatically sent to researchers based on researcher specified parameters. The emails may be triggered when data is uploaded to the central server. Researchers have the option of providing an email address as part of the system's remote access registration on the website. If an email address is available, the central computer will send an email alert to the researcher whenever a subject syncs remotely. This email alert provides the researcher with the data collection device username, the protocol, and the date and time of the sync. Researchers can then review the data from this sync on the web and determine if further follow-up is required. The researchers may configure the system such that they are alerted only when a subject fails to sync within a specified period or when a data point from the field protocol questionnaire meets a specified criteria (e.g. symptoms consistent with an adverse reaction).

From the field protocol web page (see FIG. 2) of the central computer, the researcher browses the design computer protocol directory and selects the field protocol to be made available for remote sync between the central computer and the design computer. When selected, the field protocol file is copied from the design computer to the central computer. Researchers can assign a protocol to specific participants (subjects or patients) to be able to sync their data to the web server from a remote location. By specifying the identifier for the data collection device (username) and the protocol to associate with the participant, the web server can verify a match to the data collection device being synced, download the appropriate field protocol if needed, and upload the field protocol data available on the data collection device.

The participant (or research staff member if interview or observation data are being collected) is directed to the central computer website and clicks an electronic link which downloads and installs the remote conduit on the computer. After installation, each time the data collection device is synced, the program connects to the Internet, verifies a match between the data collection device username on the data collection device and on the server (as specified by the researcher), uploads new data not previously uploaded to the server database, and then downloads any changes or modifications to the field protocol assigned. The participant needs only to a) go to the system website and click, "Install Remote Sync Conduit" and b) press the sync button to upload data.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system to generate and deploy a self-monitoring field protocol comprising a sequence of electronic questionnaires, said system comprising:
   a design computer comprising a processor, a graphical user interface and a memory having a structured database and a library of software modules, wherein
      said library of software modules comprises a start questionnaire module, an end questionnaire module, and a data collection module,
      said structured data base comprises data fields linkable to the software modules to enable an exchange of structured data between the modules and the database, and
      said graphical user interface (GUI) comprises a display presenting a plurality of icons each corresponding to and electronically linked to one of the software modules, a screen display region for arranging selected icons in a logical sequence corresponding to a questionnaire of the field protocol, said GUI further comprises an electronic link to an alerting program for assigning an alert to each questionnaire,
   wherein said design computer stores the questionnaires generated for the field protocols and assigned alerts, converts the questionnaires and assigned alerts to a plurality of file formats compatible with a plurality of different types of data collection devices, and downloads the field protocols to each of the data collection devices.

2. The system of claim 1 wherein said memory further comprises a formatting program for formatting a plurality of questionnaires and associated alerts into a standard file format.

3. The system of claim 1 wherein the GUI further comprises a node operational mode for editing the software modules and a node linking mode for electronically linking the edited modules.

4. The system of claim 1 wherein said GUI further comprises a flow diagram format for constructing the questionnaires.

5. The system of claim 1 wherein the software modules comprise templates with structured data fields linked to the database.

6. The system of claim 1 wherein the structured data format is extended markup language (XML).

7. The system of claim 1 wherein said design computer comprises a Design computer and a central computer electronically linked to the Design computer and to the data collection devices.

8. The system of claim 1 wherein said formats compatible with a plurality of different type data collection devices comprise a text format and hyper text mark-up language (HTML).

9. The system of claim 1 wherein the data collection devices further comprise handheld computers or cellular telephones or other computers or combination of computers thereof.

10. A method to establish an alerting mechanism for questionnaire responses for a self-monitoring field protocol comprising a series of questionnaires, said method comprising:
   a. generating the series of questionnaires;
   b. establishing an alert for each questionnaire to trigger the questionnaire when an event defined by the alert occurs;
   c. determining when each alert occurs;
   d. presenting each questionnaire to the participant based on the occurrence of the alert for the questionnaire, and
   e. when substantially contemporaneous alerts occur, determining a priority of the contemporaneous alerts based on a priority of alerts assigned during the establishment of the alert.

11. A method as in claim 10 wherein the substantially contemporaneous alerts are a plurality of alerts occurring during the presentation of a prior questionnaire.

12. A method as in claim 10 further comprising queuing alerts as they occur and using an alert queue to determine the priority of contemporaneous alerts.

13. A method as in claim 10 wherein the alerts comprise fixed time of day alerts, fixed time interval alerts, random interval alerts and event conditional alerts or any other predefined alert schedule.

14. A method as in claim 10 wherein the field protocol is part of any research activity involving an assessment of or instructions to any of a research participant, an interviewer and an observer in the field.

15. A method as in claim 10 further comprising validating the series of questionnaires by confirming that each questionnaire is consistent with a set of predefined logical rules.

16. A method as in claim 10 further comprising validating the series of questionnaires by confirming that each questionnaire has a start node and an end node.

17. A method as in claim 10 further comprising validating the series of questionnaires by confirming that the series of questionnaires of the field protocol are performed without omitting a questionnaire.

18. A method as in claim 10 wherein generating the questionnaires further comprises formatting the questionnaires in a standard data format and subsequently automatically converting the questionnaires in the standard data format to a data format compatible with a device used by the study participants.

19. A method as in claim 18 wherein the standard data format is extendible markup language (XML).

20. A system to generate and deploy a self-monitoring field protocol comprising a sequence of electronic questionnaires, said system comprising:

a design computer comprising a processor, a graphical user interface and a memory having a structured database and a library of software modules, wherein said library of software modules comprises a start questionnaire module, an end questionnaire module, and a data collection module, said structured data base comprises data fields linkable to the software modules to enable an exchange of structured data between the modules and the database, and said graphical user interface (GUI) comprises a display presenting a plurality of icons each corresponding to and electronically linked to one of the software modules, a screen display region for arranging selected icons in a logical sequence corresponding to a questionnaire of the field protocol.

21. A system as in claim 20 wherein said design computer stores the questionnaires generated for the field protocols and assigned alerts, converts the questionnaires and assigned alerts to a plurality of file formats compatible with a plurality of different types of data collection devices, and downloads the field protocols to each of the data collection devices.

22. A system to generate and deploy a self-monitoring field protocol comprising a sequence of electronic questionnaires, said system comprising:

a design computer comprising a processor, a graphical user interface and a memory having a structured database and a library of software modules, wherein said library of software modules comprises a start questionnaire module, an end questionnaire module, and a data collection module, said structured data base comprises data fields linkable to the software modules to enable an exchange of structured data between the modules and the database;

said graphical user interface (GUI) comprises a display presenting a plurality of icons each corresponding to and electronically linked to one of the software modules, a screen display region for arranging selected icons in a logical sequence corresponding to a questionnaire of the field protocol, said GUI further comprises an electronic link to an alerting program for assigning an alert to each questionnaire and said GUI further comprises a node operational mode for editing the software modules and a node linking mode for electronically linking the edited modules;

said memory further comprises a formatting program for formatting a plurality of questionnaires and associated alerts into a standard file format memory, and the software modules further comprise templates with structured data fields linked to the database.

23. The system of claim 22 wherein said GUI further comprises a flow diagram format for constructing the questionnaires.

24. The system of claim 22 wherein said GUI further comprises a data view format for displaying data from the structured data base and wherein the structured data base further comprises data uploaded from data collection devices executing the field protocol.

25. The system of claim 24 wherein the processor aggregates data uploaded from the data collection devices for storage in the data base.

26. The system of claim 22 wherein the GUI further comprises a view format that sequentially displays the logical sequence of each questionnaire of a field protocol.

* * * * *